Nov. 24, 1970     W. E. SPLAIN     3,543,030
X-RAY APPARATUS HAVING A CURRENT MEASURING CIRCUIT WITH
CAPACITY CURRENT COMPENSATION
Filed Feb. 28, 1968

INVENTOR.
WALTER E. SPLAIN
BY Watts, Hoffmann,
Fisher & Heinke
ATTORNEYS

United States Patent Office 3,543,030
Patented Nov. 24, 1970

3,543,030
X-RAY APPARATUS HAVING A CURRENT
MEASURING CIRCUIT WITH CAPACITY
CURRENT COMPENSATION
Walter E. Splain, Solon, Ohio, assignor to Picker Corporation, White Plains, N.Y., a corporation of New York
Filed Feb. 28, 1968, Ser. No. 708,963
Int. Cl. H05g 1/32
U.S. Cl. 250—103
6 Claims

ABSTRACT OF THE DISCLOSURE

In an X-ray apparatus high-voltage transformer, capacity-current compensating means are connected in series with the usual transformer secondary windings. Low impedance measuring means are connected across the compensating means. Means are provided for supplying a signal for external control apparatus without changing the effective input impedance of the measuring means.

BACKGROUND OF THE INVENTION

Field of the invention

This invention relates to a current measuring circuit for X-ray apparatus, and, more particularly, to such a circuit embodying means for compensating for capacity current in a high-voltage transformer secondary winding.

Discussion of the prior art

It is conventional in X-ray apparatus to provide a high-voltage transformer having two secondary windings. Opposite ends of the secondary windings are connected to supply high voltage to a full-wave rectifier bridge, which provides direct-current energization of an X-ray tube. It is also conventional to connect a meter in series between the two secondary windings to indicate current in the secondary windings and hence current through the X-ray tube.

It has long been recognized that a meter so connected does not accurately indicate true current through the X-ray tube. This is due to the fact that distributed capacitance of the secondary windings and the transformer core, as well as other distributed capacitances of the circuit, cause a capacity current to be induced in the secondary windings. This capacity current, which may be as great as two or three milliamperes, causes an erroneous meter indication. In fact, the capacity current may even effectively mask the true X-ray tube current in applications, such as in fluoroscopy, where the X-ray tube current itself is quite small (e.g., of the order of one milliampere).

Various solutions have been proposed for solving the foregoing capacity current problem. Most of these have involved the use of an auxiliary transformer for ideally supplying to the meter a compensating current equal to the capacity current and 180° out-of-phase with the capacity current. This has lead to the provision of systems embodying auxiliary transformers to provide a current to buck the capacity current. Systems such as those disclosed in U.S. Pat. No. 2,098,275 of Cassen and No. 2,189,894 of Goldfield et al. are exemplary of this type of solution.

The system in the Cassen patent uses an auxiliary transformer having a primary winding connected in series with the secondary windings of the high voltage transformer. One of two secondary windings of the auxiliary transformer is connected to the primary supply for the high voltage transformer and induces in a second secondary winding of the auxiliary transformer a current which bucks the current induced therein by capacitive current in the high voltage transformer. A meter is connected across the second secondary winding of the auxiliary transformer.

In the disclosure of the Goldfield et al. patent, a bucking current is also supplied by an auxiliary separate transformer having its primary winding in parallel with the primary winding of the high voltage transformer. The auxiliary transformer is intended to supply another capacity current in the meter circuit of the same amplitude as the high-voltage transformer capacity current, but 180° out-of-phase therewith to afford compensation.

Unfortunately, the concept of providing an auxiliary transformer to provide a bucking capacity current has not worked out entirely satisfactorily in practice. This is due primarily to small voltage shifts in the two secondaries of the high voltage and auxiliary transformers respectively, so that the current indications provided by the meter are not completely accurate and reliable.

A more satisfactory solution to the capacity current problem is provided by the apparatus shown in U.S. Pat. No. 2,322,404 of Weisglass. In the Weisglass apparatus, a high voltage transformer having the usual two secondary windings is provided with a compensating winding wound upon the same core as the two secondary windings. The compensating winding is connected in series with a capacitor and in series with the other two secondary windings and provides a capacity current of the same amount as the sum of all the capacity currents in the first two secondary windings but 180° out-of-phase therewith. A metering circuit comprising a full-wave rectifier bridge is connected across the compensating winding and capacitor, and a meter is connected across the output of the rectifier bridge. Such an arrangement eliminates the disadvantages of those circuits having a separate compensating transformer, in that the bucking current induced in the compensating winding varies with the capacity current induced in the other two secondary windings because all are energized from the same transformer primary winding. Nevertheless, the apparatus provided by Weisglass still has one inherent and important disadvantage.

In present day X-ray apparatus, it is extremely desirable and, in some cases imperative, to provide a signal proportional to X-ray tube current for controlling other quantities, such as the filament current in the X-ray tube to control the X-ray tube current. This requirement, however, is not consonant with the type of circuit disclosed by Weisglass. It is necessary in order not to affect the compensating current that the voltage drop across the measuring means connected across the compensating means be kept small and virtually constant. The voltage drop across the measuring means should be kept small in order to drain little power from the high voltage circuit, and it should be kept virtually constant in order not to adversely affect the compensating current. In the Weisglass apparatus, the power loss in the metering means will probably be small, because the meter is connected directly across the rectifier bridge, and such a meter (milliammeter) generally has a low impedance. However, because the meter is so connected, the voltage drop across the bridge will vary in accordance with the high voltage induced in the transformer secondary windings. Perhaps even more important is the fact that it is impossible to obtain an output signal for use in other control circuitry of the X-ray apparatus without seriously affecting the impedance of the measuring means and hence affecting the compensating current in the winding across which the measuring means is connected.

The present invention solves the foregoing problems, and provides a current measuring circuit in which the voltage drop across the measuring means connected across the compensating winding is small and virtually constant and means are provided for supplying a signal for external control apparatus without changing the effective impedance of the measuring means.

SUMMARY OF THE INVENTION

An X-ray apparatus embodies a conventional high-voltage transformer having two secondary windings that are normally connected in series to provide high voltage to a rectifier bridge for an X-ray tube. A capacity current compensating winding is connected in series with a capacitor between the two secondary windings of the high voltage transformer. Current measuring means are connected across the compensating winding and its series-connected capacitor.

The measuring means comprises a full-wave rectifier bridge, across the output of which is connected low-input-impedance current transfer means that provides a small, relatively constant direct-current voltage drop in response to alternating current energization of the measuring means rectifier. Current in a high-impedance output of the current transfer means energizes a direct-current milliammeter, and also provides a signal to external control circuitry for controlling other quantities such as current through the X-ray tube.

In another embodiment, a selectively-actuatable shunt is provided across the milliammeter to provide two ranges for current measurements. Direct current flow through the milliammeter is useful during fluoroscopic operation, wherein the X-ray tube current is normally at a low level, and shunt operation is useful in direct X-ray exposure techniques wherein the current through the X-ray tube is high.

DESCRIPTION OF PREFERRED EMBODIMENTS

Figure 1:
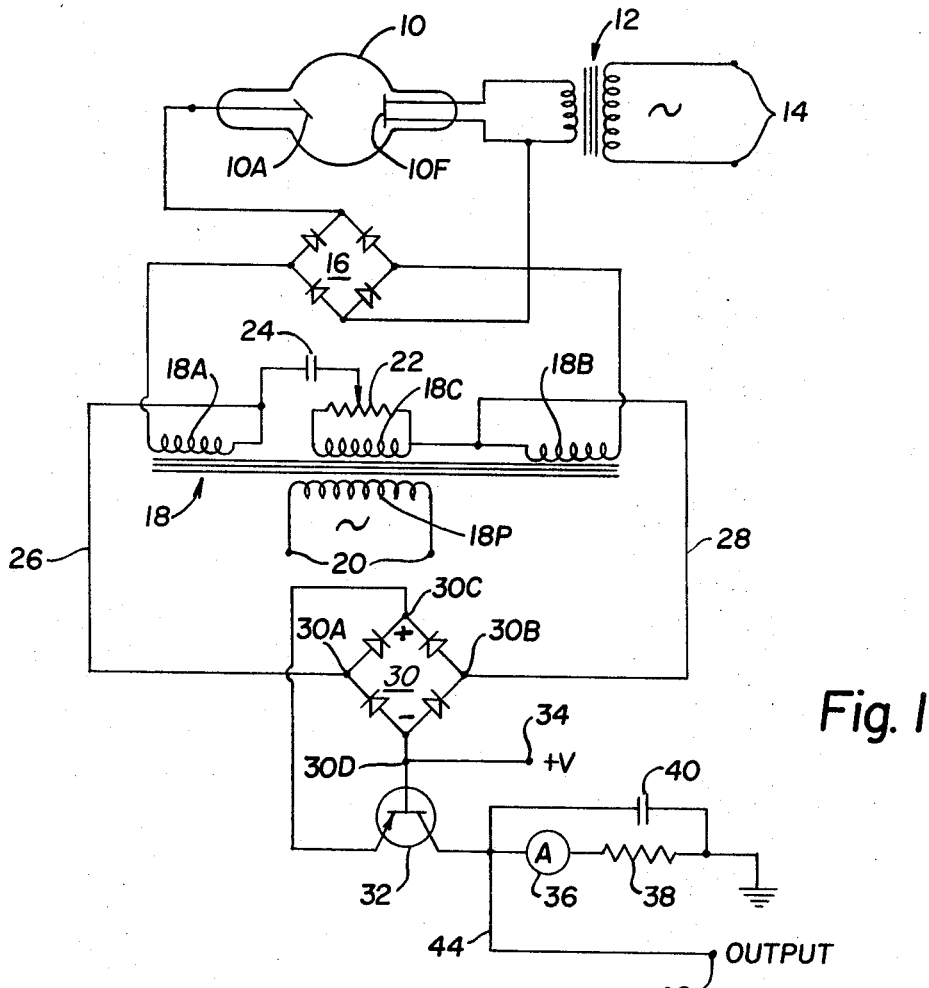
FIG. 1 is a partially schematic and partially diagrammatic illustration of apparatus embodying the invention.

X-ray apparatus embodying a conventional X-ray tube 10 is illustrated in FIG. 1. The X-ray tube 10 has an anode 10A and a filament 10F, the filament 10F being energized in conventional manner from a secondary winding of a filament transformer 12. A primary winding of the filament transformer 12 is connected to a pair of input terminals 14, to which is connected a conventional source of alternating current (not shown). The anode 10A and filament 10F (cathode) of the X-ray tube 10 are respectively connected to output terminals of a conventional full-wave rectifier bridge 16.

High voltage is provided to the X-ray tube 10 through the rectifier bridge 16 from a high-voltage transformer 18. The transformer 18 is provided with a primary winding 18P, opposite ends of which are connected to a pair of input terminals 20. The input terminals 20 may be conventionally supplied with alternating current from a source (not shown) such as an auto-transformer in a control circuit (not shown). The high voltage transformer 18 is also provided with a pair of secondary windings 18A, 18B, opposite ends of which are connected to input terminals of the full-wave rectifier bridge 16. The apparatus thus far described is entirely conventional in nature. However, if the apparatus were further connected in conventional fashion, it would include a current measuring meter connected in series between the secondary windings 18A, 18B to measure the current through the X-ray tube 10.

In accordance with the invention, the high-voltage transformer 18 is provided with a third secondary winding 18C, which serves as a compensating winding. A potentiometer 22 is connected across the compensating winding 18C, and one end of the parallel combination is connected to one end of the secondary winding 18B. A movable arm of the potentiometer 22 is connected through a capacitor 24 to an end of the secondary transformer winding 18A.

The capacity current induced in the secondary windings 18A, 18B of the transformer 18 is substantially 90° out-of-phase with the current induced in those windings for energizing the X-ray tube 10. Therefore, by providing a compensating winding 18C and a capacitor 24 in series therewith, a bucking or compensating current is provided that is 180° out-of-phase with the capacity current caused by distributed capacitances of the transformer. The potentiometer 22, which has a relatively low resistance value, provides a capacity current adjustment, so that the value of compensating current can be adjusted to exactly compensate for the capacity current induced in the secondary windings of the transformer.

Current measuring means are connected across the series combination of the compensating winding 18C and the capacitor 24 by means of leads 26, 28. As shown in FIG. 1, the leads 26, 28 are connected to input terminals 30A, 30B of a full-wave rectifier bridge 30. The rectifier bridge 30 also has output terminals 30C, 30D.

In the embodiment shown in FIG. 1, the terminals 30C, 30D are respectively connected to the emitter and base electrodes of a PNP transistor 32. A source of positive voltage (not shown) is also connected to the base of the transistor 32 at an input terminal 34 to provide a reference voltage level. The collector electrode of the transistor 32 is connected to ground through a series-connected direct-current milliammeter 36 and a load resistor 38. A capacitor 40 is connected across the ammeter 36 and the resistor 40. This is desirable because the input to the ammeter 36 is a pulsating direct current. The capacitor 40 thus integrates and smooths the pulsations of the current being measured.

The PNP transistor 32 is connected in a common-base configuration, wherein the emitter and base are common to the input circuit and the collector and base are common to the output circuit. As is well known, such a configuration presents a low input impedance and a high output impedance, while still providing that the current flow into the meter 36 is almost equal to the impressed emitter current. Thus, current through the milliammeter 36 is substantially directly proportional to current through the secondary windings 18A, 18B of the transformer 18, and hence is almost directly proportional to current between the anode and cathode of the X-ray tube 10. The low input impedance of the common-base transistor connection insures that little power will be drawn from the secondary circuit of the high voltage transformer 18.

A signal for provision to external control circuitry (not shown) is available at an output terminal 42, which is connected by means of a lead 44 to a point between the collector of the transistor 32 and one side of the milliammeter 36. It is particularly pointed out that the output signal may be provided on the lead 44 from the collector of the transistor 32 without adversely affecting the operation of the current compensating means for bucking out the capacitive current induced in the secondary windings of the high voltage transformer 18. This is made possible by the high output impedance of the common-base connection of the transistor 32. In other words, the transistor 32 serves as low-input-impedance, high-output-impedance current transfer means between the rectifier bridge 30 and the metering device 36 (milliammeter).

Figure 2:
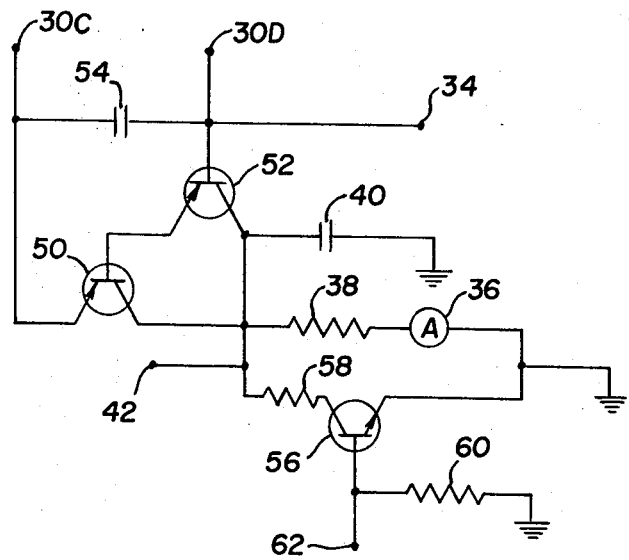
FIG. 2 is a schematic diagram showing a modification of a portion of the apparatus as shown in FIG. 1.

FIG. 2 illustrates a modification of a system embodying the invention. As shown in that figure, the PNP transistor 32 of FIG. 1 has been replaced by two PNP transistors 50, 52 connected in a Darlington configuration. In other words, the base of the transistor 50 is connected directly to the emitter of the transistor 52, so that the two transistors function together as a single transistor. By using this configuration, the ratio of the collector output current to the emitter input current more closely approaches unity that is possible using a single transistor.

The emitter of the transistor 50 is connected to the output terminal 30C of the rectifier bridge 30, and the base of the transistor 52 is connected to the output terminal 30D. A capacitor 54 is connected between the two output terminals 30C, 30D to smooth or integrate the pulsating D.C. voltage applied to the Darlington combination. The collectors of the transistors 50, 52 are connected together and to the series combination of the resistor 38 and the milliammeter 36 in the same manner as in the embodiment shown in FIG. 1. In operation, the embodiment shown in FIG. 2 is identical to that shown in FIG. 1 so far as its construction thus far described. In a manner similar to that shown in the first embodiment, an output terminal 42 is connected to the collectors of the transistors 50, 52 to provide a signal for other control circuitry of the X-ray apparatus.

The embodiment shown in FIG. 2 differs from that shown in FIG. 1 also in that a shunt circuit is selectively-connectable across the resistor 38 and meter 36 to provide two ranges of current measuring capability. It is to be understood that such a shunt circuit may be provided in the embodiment shown in FIG. 1. As shown, the shunt comprises an NPN transistor 56 having its collector electrode connected through a resistor 58 to the collectors of the transistors 50, 52. The emitter of the transistor 56 is connected directly to ground, and the transistor base is grounded through a resistor 60. An input terminal 62 is also connected to the base of the transistor 56.

In the absence of an input signal at the terminal 62, such as during periods of fluoroscopy when the X-ray tube current is low, the shunting transistor 56 is nonconductive. Therefore, current flows from the transistors 50, 52 through the resistor 38 and the meter 36. During periods of high X-ray tube current, such as occur during radiographic or spot film exposures, positive signals may be provided to the input terminal 62 from exposure control circuitry (not shown). The positive signals cause the transistor 56 to conduct and effectively place the transistor 56 and resistor 58 in parallel with the meter 36 and resistor 38. Thus, current through the meter 36 is reduced by a predetermined proportion to provide a second or high-current scale indication on the meter.

It is now apparent that the invention provides a current measuring circuit with capacity compensation that fulfills an obvious need in the art. The measuring means in no way affects the compensation provided for the capacity current in the high-voltage transformer secondary windings. Furthermore, a control signal proportional to the X-ray tube current may be provided by the circuit without affecting the compensation in any way.

Although two embodiments of the invention have been shown and described, many modifications may be made by one skilled in the art without departing from the true spirit and scope of the invention.

I claim:
1. In an X-ray apparatus having an X-ray tube, a high-voltage transformer with secondary winding means wherein unwanted capacity current is present, a first rectifier connected between said secondary winding means and said X-ray tube for providing direct current to said X-ray tube, a current measuring circuit comprising:
  (a) compensating means comprising a compensating winding on said transformer connected in series with a capacitor and both connected in series with said secondary winding means to provide compensating current to oppose and substantially neutralize said capacity current;
  (b) a second rectifier having an alternating-current input and two direct-current output terminals, said input being connected across said series-connected compensating winding and said capacitor;
  (c) first and second transistors each having base, emitter and collector electrodes, said transistors being connected together in Darlington configuration, the base electrode of said first transistor being connected to one of said two direct-current output terminals and one of said emitter and collector electrodes of said second transistor being connected to the other of said two direct-current output terminals, and
  (d) current metering means connected between said base electrode of said first transistor and another one of said collector and emitter electrodes of said second transistor for indicating current through said X-ray tube.

2. The apparatus of claim 1, further including means in electrical circuit with said metering means for providing an output signal proportional to said current through said X-ray tube.

3. The apparatus of claim 2, further including selectively-operable current shunting means connected across said metering means.

4. The apparatus of claim 2, further including means for integrating current supplied to said metering means and to said means for providing an output signal.

5. The apparatus of claim 4, further including selectively-operable current shunting means connected in parallel with said metering means.

6. The apparatus of claim 1, further including means for integrating current supplied to said metering means.

References Cited

UNITED STATES PATENTS

| | | | |
|---|---|---|---|
| 2,322,404 | 6/1943 | Weisglass | 250—100 |
| 2,915,706 | 12/1959 | Zwicker et al. | 324—119 X |
| 3,221,249 | 11/1965 | Shearer et al. | 324—119 X |
| 3,257,615 | 6/1966 | Slenker | 324—123 |
| 3,360,727 | 12/1967 | Justice | 324—119 X |

FOREIGN PATENTS 934,722    8/1963    Great Britain.

ARCHIE R. BORCHELT, Primary Examiner

A. L. BIRCH, Assistant Examiner

U.S. Cl. X.R.

307—315; 324—115, 119, 123